United States Patent
Maibach et al.

(10) Patent No.: US 9,385,619 B2
(45) Date of Patent: Jul. 5, 2016

(54) METHOD FOR OPERATING A CONVERTER CIRCUIT

(75) Inventors: Philippe Maibach, Muhen (CH); Thomas Schaad, Oberbipp (CH); Marc Willomitzer, Kirchdorf (CH)

(73) Assignee: ABB TECHNOLOGY AG, Zürich (CH)

( * ) Notice: Subject to any disclaimer, the term of this patent is extended or adjusted under 35 U.S.C. 154(b) by 106 days.

(21) Appl. No.: 14/389,151

(22) PCT Filed: Jun. 6, 2012

(86) PCT No.: PCT/EP2012/060754
§ 371 (c)(1),
(2), (4) Date: Jan. 8, 2015

(87) PCT Pub. No.: WO2013/143623
PCT Pub. Date: Oct. 3, 2013

(65) Prior Publication Data
US 2015/0124497 A1  May 7, 2015

(30) Foreign Application Priority Data
Mar. 28, 2012 (EP) ..................... 12161763

(51) Int. Cl.
*H02M 5/45* (2006.01)
*H02M 5/458* (2006.01)
*H02M 1/00* (2006.01)

(52) U.S. Cl.
CPC .............. *H02M 5/45* (2013.01); *H02M 5/4505* (2013.01); *H02M 5/458* (2013.01); *H02M 5/4585* (2013.01); *H02M 2001/0032* (2013.01); *H02M 2001/0054* (2013.01); *Y02B 70/16* (2013.01)

(58) Field of Classification Search
CPC ..... H02M 5/45; H02M 5/458; H02M 5/4505; H02M 5/4585; H02M 2001/0032; H02M 2001/0054; Y02B 70/16
See application file for complete search history.

(56) References Cited

U.S. PATENT DOCUMENTS

| | | | |
|---|---|---|---|
| 5,010,467 A | 4/1991 | Tokiwa et al. | |
| 2007/0108771 A1* | 5/2007 | Jones | H02P 9/102 290/44 |
| 2007/0216164 A1* | 9/2007 | Rivas | H02P 9/007 290/44 |
| 2007/0267873 A1* | 11/2007 | Teichmann | F03D 7/0224 290/44 |

(Continued)

FOREIGN PATENT DOCUMENTS

| | | |
|---|---|---|
| DE | 10 2010 025647 A1 | 12/2011 |
| DE | 10 2011 113055 A1 | 3/2012 |

(Continued)

OTHER PUBLICATIONS

International Search Report (PCT/ISA/210) mailed on Aug. 29, 2013, by the European Patent Office as the International Searching Authority for International Application No. PCT/EP2012/060754.

(Continued)

*Primary Examiner* — Jue Zhang
(74) *Attorney, Agent, or Firm* — Buchanan Ingersoll & Rooney PC

(57) ABSTRACT

A method is disclosed for operating a converter circuit, in which controllable power semiconductor switches of the rectifier unit of a converter circuit are controlled by a rectifier switch signal and the controllable power semiconductor switches of the inverter unit of the converter circuit are controlled by an inverter switch signal. In order to reduce losses in the no-load state of the converter circuit, the rectifier switch signal is blocked in order to disconnect the controllable power semiconductor switches of the rectifier unit if defined conditions of the converter circuit are fulfilled.

8 Claims, 3 Drawing Sheets

(56) References Cited

U.S. PATENT DOCUMENTS

| | | | | |
|---|---|---|---|---|
| 2007/0273155 | A1* | 11/2007 | Barton | H02M 5/4585 290/44 |
| 2008/0031024 | A1 | 2/2008 | Pasuri et al. | |
| 2010/0192788 | A1 | 8/2010 | Tanaka et al. | |
| 2012/0068637 | A1 | 3/2012 | Iwashita et al. | |
| 2014/0361624 | A1* | 12/2014 | Ault | H02J 9/062 307/65 |

FOREIGN PATENT DOCUMENTS

| | | |
|---|---|---|
| EP | 0 367 247 A2 | 5/1990 |
| EP | 2 214 302 A2 | 8/2010 |

OTHER PUBLICATIONS

Written Opinion (PCT/ISA/237) mailed on Aug. 29, 2013, by the European Patent Office as the International Searching Authority for International Application No. PCT/EP2012/060754.

International Preliminary Report on Patentability (PCT/IPEA/409) mailed on Jul. 1, 2014, by the European Patent Office as the International Preliminary Examining Authority for International No. PCT/EP2012/060754.

English Translation of International Preliminary Report on Patentability (PCT/IPEA/409) mailed on Jul. 1, 2014, by the European Patent Office as the International Preliminary Examining Authority for International Application No. PCT/EP2012/060754.

* cited by examiner

METHOD FOR OPERATING A CONVERTER CIRCUIT

TECHNICAL FIELD

The invention relates to the field of power electronics. It proceeds from a method for operating a converter circuit according to the preamble of the independent claim.

PRIOR ART

Nowadays, converter circuits are used in a multiplicity of applications. A converter circuit of this type has, for example, a rectifier unit, to the AC voltage-side of which a first electrical AC voltage system is connected via a system-side impedance. The system-side impedance can be an inductance or a transformer. Furthermore, the converter circuit comprises a capacitive energy storage circuit which is connected to the DC voltage-side of the rectifier unit. The rectifier unit has a plurality of controllable and non-controllable power semiconductor switches and allows four-quadrant drive. The converter circuit also has an inverter unit, to the DC voltage-side of which the capacitive energy storage circuit is connected and to the AC voltage-side of which a load-side impedance is connected, it being possible for said load-side impedance to be designed as an inductance or as a transformer. The inverter unit has a multiplicity of controllable and non-controllable power semiconductor switches and allows four-quadrant drive. A second electrical AC voltage system is usually connected to the load-side impedance, to which second electrical AC voltage system an electrical load is usually connected.

During operation of the converter circuit, the controllable power semiconductor switches of the rectifier unit are controlled by a rectifier switch signal. The controllable power semiconductor switches of the inverter unit are controlled by an inverter switch signal. The rectifier switch signal and the inverter switch signal are generated in a converter control unit. If an electrical load is connected to the second electrical AC voltage system and if said electrical load is to be supplied by the first electrical AC voltage system, the converter control unit thus generates a rectifier switch signal and an inverter switch signal according to the requirements for supplying the electrical load.

If, during operation of the converter circuit, the electrical load is not to be supplied with electrical energy, that is to say no or almost no real power is output to the electrical load, then usually a rectifier switch signal is still generated by the converter control unit in response to a switching sequence such that the voltage across the capacitive energy storage circuit is kept at a predefinable value. Furthermore, in this state of the converter circuit, the converter control unit generates an inverter switch signal in response to a switching sequence such that the reactive power required for the second electrical AC voltage system is fed in.

In the case of operation of the converter circuit in the no-load state described above, it is a problem that switching losses occur owing to the switching of the controllable power semiconductor switches in response to the rectifier switch signal in the rectifier unit, and hence also losses occur in the system-side impedance, which losses cannot be tolerated.

SUMMARY OF THE INVENTION

The problem addressed by the invention is therefore to specify a method for operating a converter circuit by means of which losses of the converter circuit in the event that the converter circuit outputs no or almost no real power to an electrical load can be reduced. This problem is by the features of claim 1. Advantageous developments of the invention are specified in the dependent claims.

In the case of the method according to the invention for operating a converter circuit, the converter circuit comprises a rectifier unit having a multiplicity of controllable and non-controllable power semiconductor switches, wherein a first electrical AC voltage system is connected via a system-side impedance to the AC voltage-side of the rectifier unit. The converter circuit also comprises a capacitive energy storage circuit, which is connected to the DC voltage-side of the rectifier unit, and an inverter unit having a multiplicity of controllable and non-controllable power semiconductor switches, wherein the capacitive energy storage circuit is connected to the DC voltage-side of the inverter unit and a second electrical AC voltage system is connected via a load-side impedance to the AC voltage-side of the inverter unit. According to the method, the controllable power semiconductor switches of the rectifier unit are controlled by means of a rectifier switch signal. Furthermore, the controllable power semiconductor switches of the inverter unit are controlled by means of an inverter switch signal. The method according to the invention is characterized
in that
(a) the voltage across the capacitive energy storage circuit is continuously determined,
(b) a real power actual value on the AC voltage-side of the inverter unit is continuously determined,
(c) a reactive power actual value on the AC voltage-side of the inverter unit is continuously determined, and
in that, if
(d) the voltage across the capacitive energy storage circuit is within a predefinable range and
(e) the real power actual value on the AC voltage-side of the inverter unit is below a predefinable value and/or the reactive power actual value substantially corresponds to a predefinable reactive power setpoint value,
the rectifier switch signal is blocked in order to disconnect the controllable power semiconductor switches of the rectifier unit.

Owing to the blocking of the rectifier switch signal to disconnect the controllable power semiconductor switches of the rectifier unit if the conditions (d) and (e) are met, no switching actions of the controllable power semiconductor switches of the rectifier unit take place, and so, advantageously, losses of the converter circuit in the event that the converter circuit outputs no or almost no real power to an electrical load can be reduced or even almost completely avoided. The method according to the invention for operating a converter circuit is thus overall extremely simple to realize.

These and other objects, advantages and features of the present invention become apparent from the following detailed description of preferred embodiments of the invention in conjunction with the figure.

Figure 1:
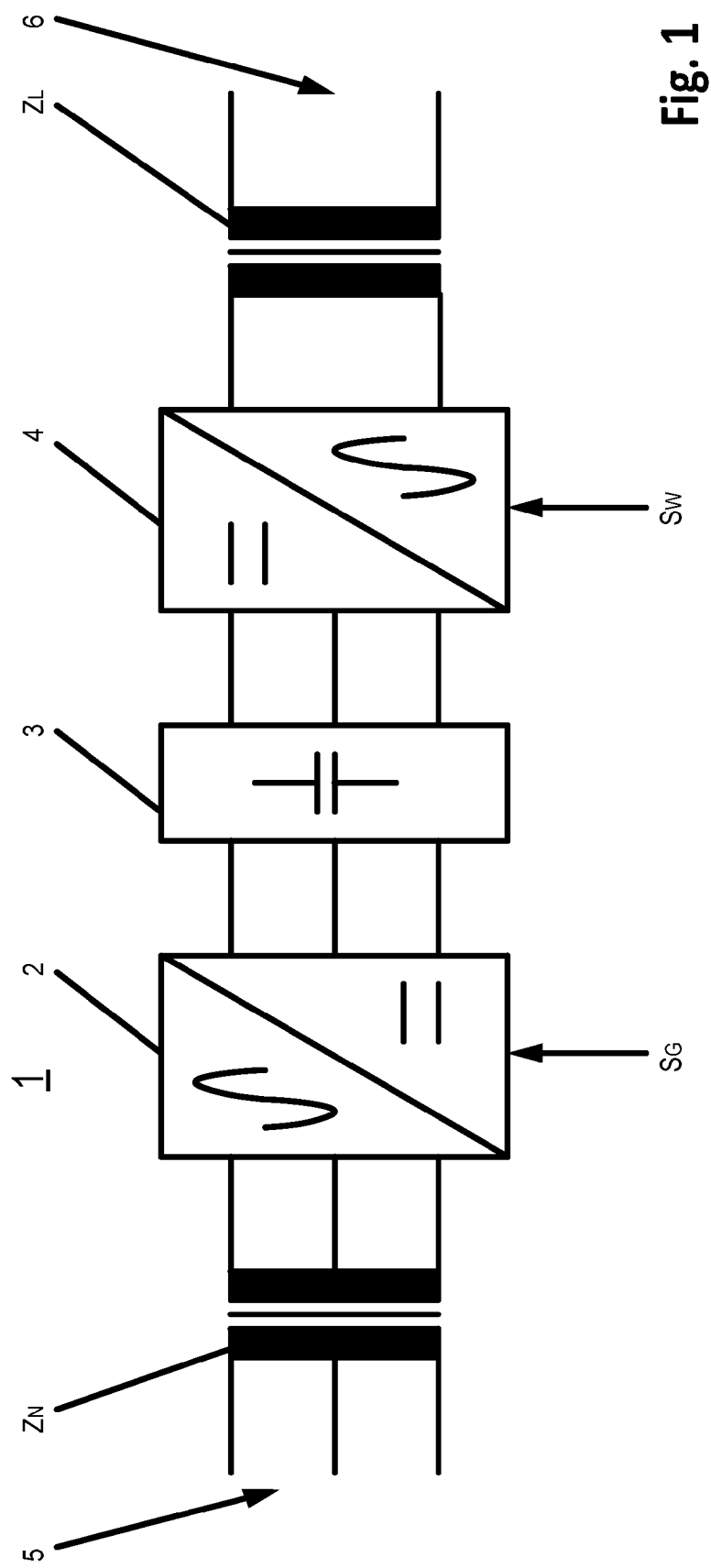
FIG. 1 shows a first embodiment of a converter circuit.

The reference signs used in the drawing and the meaning of said reference signs are listed in summarized form in the list of reference signs. In principle, identical parts are provided with identical reference signs in the figures. The described embodiments are examples of the subject matter according to the invention and have no limiting effect.

WAYS OF REALIZING THE INVENTION

Figure 2:
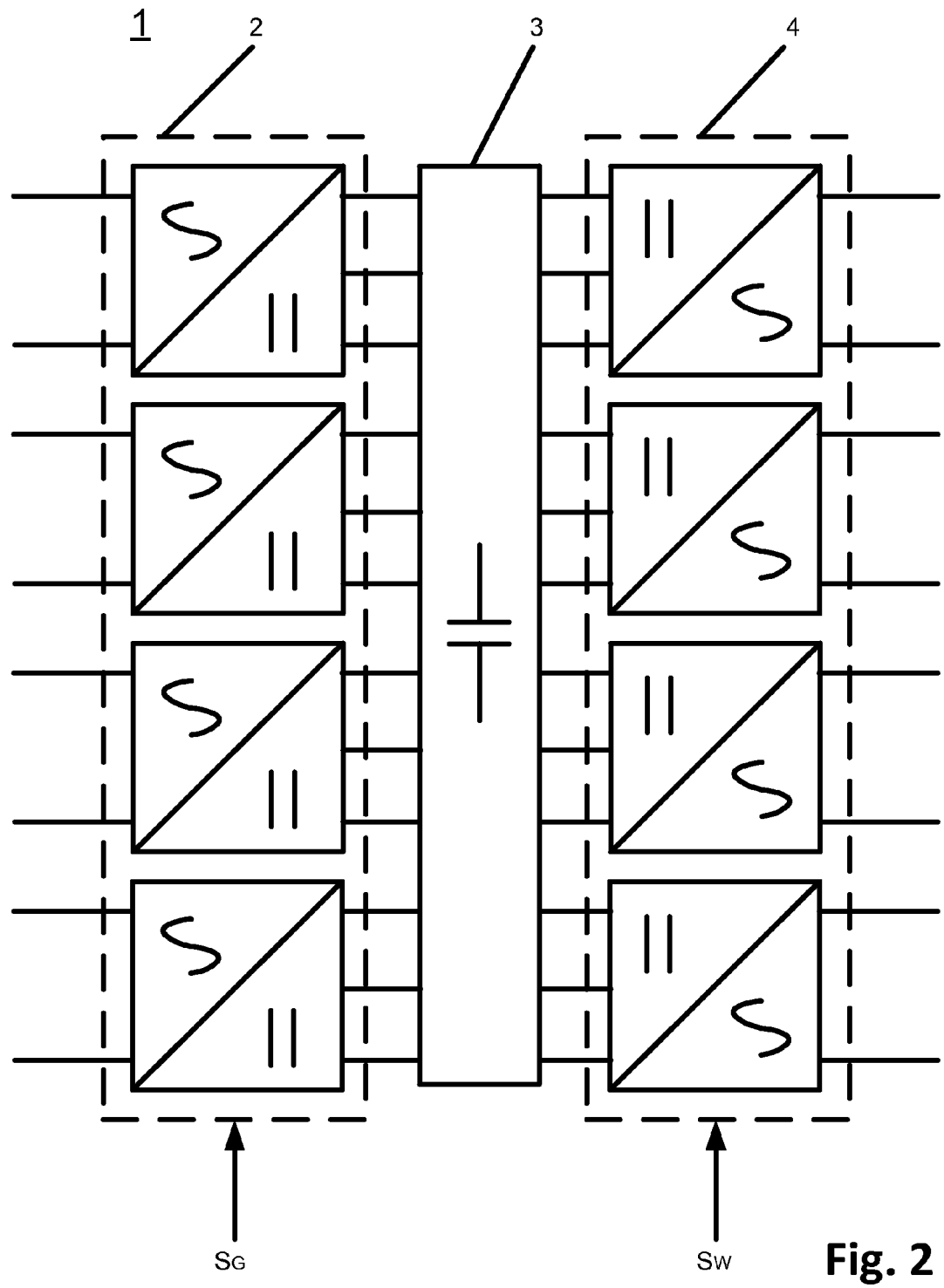
FIG. 2 shows a second embodiment of a converter circuit.

FIG. 1 shows a first embodiment of a converter circuit 1. FIG. 2 shows a second embodiment of a converter circuit 1. In general, the converter circuit comprises a rectifier unit 2 having a multiplicity of controllable and non-controllable power semiconductor switches, wherein a first electrical AC voltage system 5 is connected via a system-side impedance $Z_N$ to the AC voltage-side of the rectifier unit 2, as shown by way of example in FIG. 1. The system-side impedance $Z_N$ is not shown in FIG. 2 for reasons of clarity. The converter circuit 1 also generally comprises a capacitive energy storage circuit 3, which is connected to the DC voltage-side of the rectifier unit 2. In general, the capacitive energy storage circuit 3 comprises at least one capacitor. In addition, the converter circuit 1 has an inverter unit 4 having a multiplicity of controllable and non-controllable power semiconductor switches, wherein the capacitive energy storage circuit 3 is connected to the DC voltage-side of the inverter unit 4 and a second electrical AC voltage system 6 is connected via a load-side impedance 4 to the AC voltage-side of the inverter unit 4, as is shown by way of example in FIG. 1. The load-side impedance $Z_L$ is not shown in FIG. 2 for reasons of clarity.

The respective controllable power semiconductor switch of the rectifier unit 2 and the inverter unit 4 can be designed as gate turn-off thyristor (GTO) or as integrated gate commutated thyristor (IGCT). However, it is also conceivable to design an above-mentioned controllable power semiconductor switch as a power MOSFET or as an insulated-gate bipolar transistor (IGBT), for example. Furthermore, the respective non-controllable power semiconductor switch of the rectifier unit 2 and the inverter unit 4 is preferably designed as a diode. Advantageously, a non-controllable power semiconductor switch is reverse-connected in parallel with each controllable power semiconductor switch, with the result that a bidirectional power semiconductor switch with controlled unidirectional current-carrying direction is formed. The rectifier unit 2 and the inverter unit 4 can then be realized, for example, as a bridge circuit with such bidirectional power semiconductor switches, wherein any wiring known to a person skilled in the art for realizing the rectifier unit 2 and the inverter unit 4 is conceivable.

In the case of the method for operating the converter circuit, the controllable power semiconductor switches of the rectifier unit 2 are now controlled by means of a rectifier switch signal $S_G$, as is indicated in FIG. 1 and FIG. 2. In addition, the controllable power semiconductor switches of the inverter unit 4 are controlled by means of an inverter switch signal $S_W$, as is likewise indicated in FIG. 1 and FIG. 2. The rectifier switch signal $S_G$ and the inverter switch signal $S_W$ are generated in a converter control unit which is not illustrated in FIG. 1 and FIG. 2 for reasons of clarity.

According to the method according to the invention for operating the converter circuit 1,
(a) the voltage $U_{DC}$ across the capacitive energy storage circuit 3 is now continuously determined,
(b) a real power actual value $P_{act}$ on the AC voltage-side of the inverter unit 4 is now continuously determined,
(c) a reactive power actual value $Q_{act}$ on the AC voltage-side of the inverter unit 4 is now continuously determined.

The rectifier switch signal $S_G$ is blocked in order to disconnect the controllable power semiconductor switches of the rectifier unit 2 if (d) the voltage $U_{DC}$ across the capacitive energy storage circuit 3 is within a predefinable range and
(e) the real power actual value $P_{act}$ on the AC voltage-side of the inverter unit 4 is below a predefinable value and/or the reactive power actual value $Q_{act}$ substantially corresponds to a predefinable reactive power setpoint value $Q_{setp}$.

Owing to the blocking of the rectifier switch signal $S_G$ to disconnect the controllable power semiconductor switches of the rectifier unit 2 if the conditions (d) and (e) are met, no switching actions of the controllable power semiconductor switches of the rectifier unit 2 take place, with the result that, advantageously, losses of the converter circuit 1 in the event that the converter circuit 1 outputs no or almost no real power to an electrical load can be reduced or even almost completely avoided. In order in this state of the converter circuit 1 to be able to feed in a reactive power required by the second electrical AC voltage system 6 from the capacitive energy storage circuit 3 into the second electrical AC voltage system 6, an inverter switch signal $S_W$ is generated in response to a corresponding switching sequence, wherein the controllable power semiconductor switches of the inverter unit 4 then switch in response to said inverter switch signal $S_W$. The capacitive energy storage circuit 3 is in this case recharged from the first AC voltage system 5 via the non-controllable power semiconductor switches of the rectifier unit 2. In the blocked state of the controllable power semiconductor switches of the rectifier unit 2, it is thus advantageously possible to feed in reactive power required by the second electrical AC voltage system 6 from the first AC voltage system 5 via the capacitive energy storage circuit into the second electrical AC voltage system 6.

Figure 3:
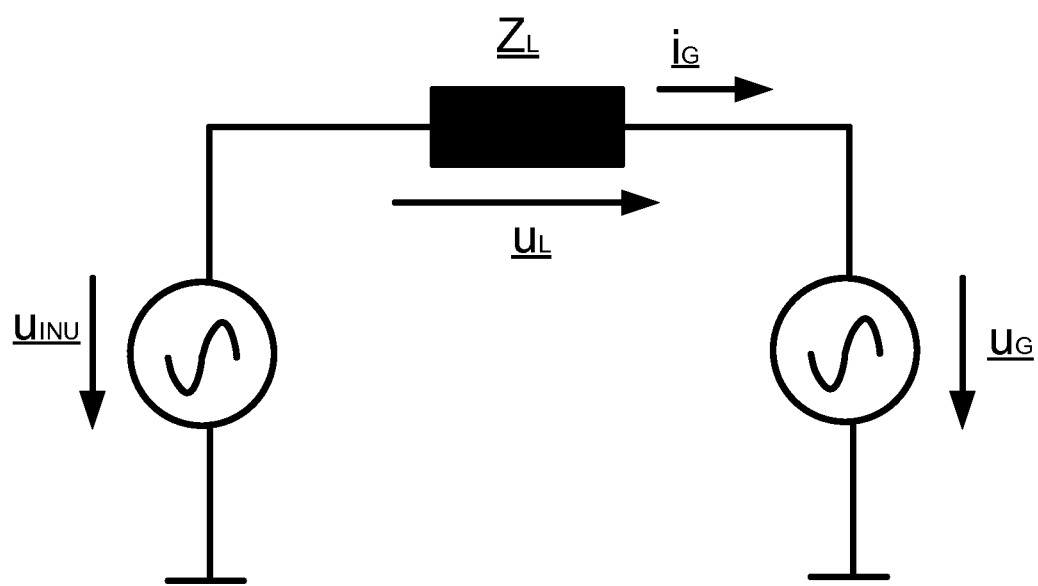
FIG. 3 shows an equivalent circuit diagram of the load side of the converter circuit.

FIG. 3 illustrates an equivalent circuit diagram of the load side of the converter circuit 1, wherein all of the variables are illustrated as complex variables and $\underline{u}_{INU}$ is the voltage at the AC voltage-side of the inverter unit 4, $\underline{u}_L$ is the voltage across the load-side impedance $\underline{Z}_L$, $\underline{i}_G$ is the current through the load-side impedance $\underline{Z}_L$ and $\underline{u}_G$ is the voltage of the second electrical AC voltage system 6. The following relationships thus emerge from FIG. 3:

$$\underline{u}_L = \underline{i}_G \cdot \underline{Z}_L \quad [1]$$

$$\underline{u}_{INU} = \underline{u}_L + \underline{u}_G \quad [2]$$

wherein $\underline{u}_{INU}$ is preferably measured and is $|\underline{u}_{INU}| \sim U_{DC}$ (voltage across the capacitive energy storage circuit 3). Furthermore, the voltage $U_{DC}$ across the capacitive energy storage circuit 3 is determined by measuring.

The real power actual value $P_{act}$ on the AC voltage-side thus emerges from $$P_{act} = Re\{\underline{u}_G \cdot \underline{i}_G^*\} \quad [3]$$

and the reactive power actual value $Q_{act}$ on the AC voltage-side then emerges from $$Q_{act} = Im\{\underline{u}_G \cdot \underline{i}_G^*\} \quad [4]$$

By means of the formulae [3] and [4], the real power actual value $P_{act}$ and the reactive power actual value $Q_{act}$ can be easily determined by calculation. The calculation of the real power actual value $P_{act}$ and the reactive power actual value $Q_{act}$ advantageously takes place in the converter control unit, wherein the variables necessary for the calculation are supplied to the converter control unit.

It has proven to be advantageous if, if the conditions (d) and (e) are met, the rectifier switch signal $S_G$ is blocked, as mentioned above, after a period of time which can be set. Said period of time which can be set advantageously prevents the above-mentioned blocking of the rectifier switch signal $S_G$ occurring immediately when the conditions (d) and (e) are fulfilled. As a result, the blocking of the rectifier switch signal $S_G$ is insensitive in the event of rapidly changing conditions (d) and (e).

It is also conceivable that the rectifier switch signal $S_G$ is blocked in order to disconnect the controllable power semiconductor switches of the rectifier unit 2 if, in addition to the conditions (d) and (e), a predefinable real power setpoint value $P_{setp}$ is also below a predefinable value. Furthermore, it is conceivable that the rectifier switch signal $S_G$ is blocked in order to disconnect the controllable power semiconductor switches of the rectifier unit 2 if, in addition to the conditions (d) and (e), the reactive power actual value $Q_{act}$ is also below a predefinable value.

Overall, the method according to the invention for operating a converter circuit is very easy to realize and hence predestined for new installations and applications with converter circuits, but also for retrofitting of already existing converter circuits.

LIST OF REFERENCE SIGNS

1 converter circuit
2 rectifier unit
3 capacitive energy storage circuit
4 inverter unit
5 first electrical AC voltage system
6 second electrical AC voltage system
$Z_N$ system-side impedance
$Z_L$ load-side impedance
$S_G$ rectifier switch signal
$S_W$ inverter switch signal

The invention claimed is:

1. A method for operating a converter circuit, in which the converter circuit comprises includes a rectifier unit having a multiplicity of controllable and non-controllable power semiconductor switches wherein a first electrical AC voltage system is connected via a system-side impedance to an AC voltage-side of the rectifier unit, a capacitive energy storage circuit, which is connected to a DC voltage-side of the rectifier unit an inverter unit having a multiplicity of controllable and non-controllable power semiconductor switches wherein the capacitive energy storage circuit is connected to the DC voltage-side of the inverter unit and a second electrical AC voltage system is connected via a load-side impedance to an AC voltage-side of the inverter unit, the controllable power semiconductor switches of the rectifier unit being controlled by a rectifier switch signal and the controllable power semiconductor switches of the inverter unit being controlled by an inverter switch signal, wherein the method comprises:

(a) a voltage across the capacitive energy storage circuit is continuously determined;
(b) a real power actual value on the AC voltage-side of the inverter unit is continuously determined;
(c) a reactive power actual value on the AC voltage-side of the inverter unit is continuously determined; and when:
(d) the voltage across the capacitive energy storage circuit is within a predefinable range, and
(e) the real power actual value on the AC voltage-side of the inverter unit is below a predefinable value and/or the reactive power actual value substantially corresponds to a predefinable reactive power setpoint value, the rectifier switch signal is blocked in order to disconnect the controllable power semiconductor switches of the rectifier unit.

2. The method as claimed in claim 1, wherein:
the rectifier switch signal is blocked after a period of time which can be set.

3. The method as claimed in claim 1, wherein, when:
(f) a predefinable real power setpoint value is below a predefinable value, the rectifier switch signal is blocked in order to disconnect the controllable power semiconductor switches of the rectifier unit.

4. The method as claimed in claim 1, wherein, when:
(g) the reactive power actual value is below a predefinable value, the rectifier switch signal is blocked in order to disconnect the controllable power semiconductor switches of the rectifier unit.

5. The method as claimed in claim 2, wherein, when:
(f) a predefinable real power setpoint value is below a predefinable value, the rectifier switch signal is blocked in order to disconnect the controllable power semiconductor switches of the rectifier unit.

6. The method as claimed in claim 2, wherein, when:
(g) the reactive power actual value is below a predefinable value, the rectifier switch signal is blocked in order to disconnect the controllable power semiconductor switches of the rectifier unit.

7. The method as claimed in claim 3, wherein, when:
(g) the reactive power actual value is below a predefinable value, the rectifier switch signal is blocked in order to disconnect the controllable power semiconductor switches of the rectifier unit.

8. The method as claimed in claim 5, wherein, when:
(g) the reactive power actual value is below a predefinable value, the rectifier switch signal is blocked in order to disconnect the controllable power semiconductor switches of the rectifier unit.

* * * * *